(12) United States Patent
Daures

(10) Patent No.: US 8,134,923 B2
(45) Date of Patent: Mar. 13, 2012

(54) DISCOVERY OF VIRTUAL PRIVATE NETWORKS

(75) Inventor: Olivier Daures, Grasse (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2117 days.

(21) Appl. No.: 10/941,536

(22) Filed: Sep. 15, 2004

(65) Prior Publication Data

US 2006/0056314 A1 Mar. 16, 2006

(30) Foreign Application Priority Data

Sep. 18, 2003 (EP) .................................... 03292295

(51) Int. Cl.
*G01R 31/08* (2006.01)
(52) U.S. Cl. ....................... 370/231; 252/255
(58) Field of Classification Search ................. 370/437, 370/466, 401, 231, 252, 255; 709/223–225
See application file for complete search history.

(56) References Cited

U.S. PATENT DOCUMENTS

| | | | |
|---|---|---|---|
| 6,041,166 A | 3/2000 | Hart et al. | |
| 6,717,944 B1* | 4/2004 | Bryden et al. | 370/392 |
| 6,944,183 B1* | 9/2005 | Iyer et al. | 370/466 |
| 7,032,022 B1* | 4/2006 | Shanumgam et al. | 709/225 |
| 7,099,947 B1* | 8/2006 | Nadeau et al. | 709/229 |
| 2003/0140131 A1* | 7/2003 | Chandrashekhar et al. | 709/223 |
| 2003/0227915 A1* | 12/2003 | Brahim | 370/389 |
| 2004/0168088 A1* | 8/2004 | Guo et al. | 713/201 |
| 2004/0208122 A1* | 10/2004 | McDysan | 370/230 |
| 2005/0138204 A1* | 6/2005 | Iyer et al. | 709/242 |
| 2005/0177636 A1* | 8/2005 | Jamieson et al. | 709/226 |

FOREIGN PATENT DOCUMENTS

| | | |
|---|---|---|
| EP | 1 017 199 A1 | 7/2000 |
| WO | WO 00/78004 A2 | 12/2000 |

OTHER PUBLICATIONS

M. Macrae, S. Ayandeh: "Using COPS for VPN Connectivity", Internet Draft, Draft-MACRAE-Policy-COPS-VPN-OO.tst, Online! Feb. 1999, pp. 1-20, Doc. No. XP002271387.

* cited by examiner

*Primary Examiner* — Huy Vu
*Assistant Examiner* — Dady Chery

(57) ABSTRACT

A method is described of discovering at least one Virtual Private Network (VPN) automatically within a network comprising a plurality of network elements including the steps of: discovering the network elements which provide functionality for VPNs within the network; discovering the role of each network element, as identified in the preceding step, comprising identifying network elements whose role is as customer premise equipment (CPE); discovering, for each element identified as customer premise equipment, the VPN the customer premise equipment is associated with.

24 Claims, 2 Drawing Sheets

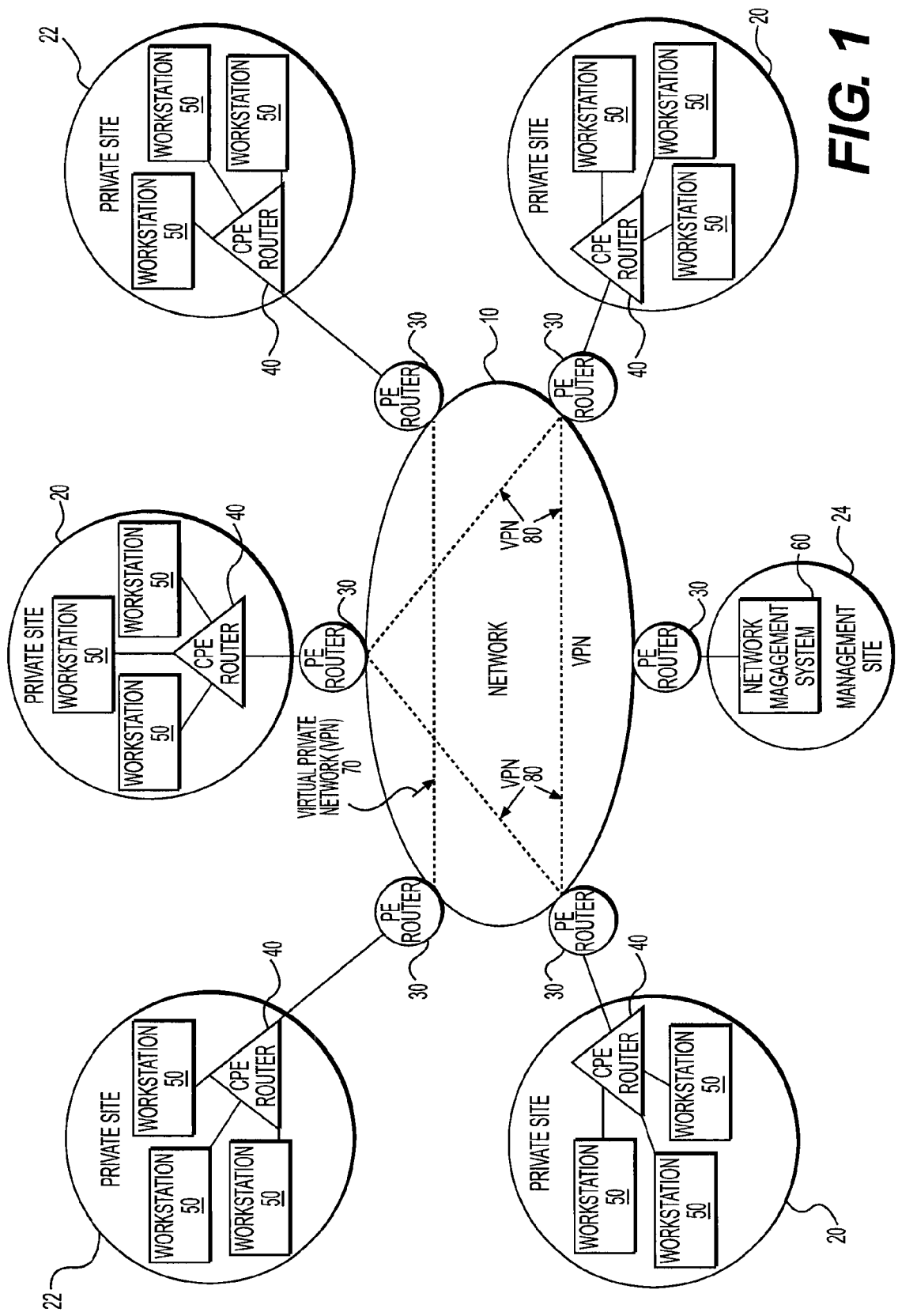

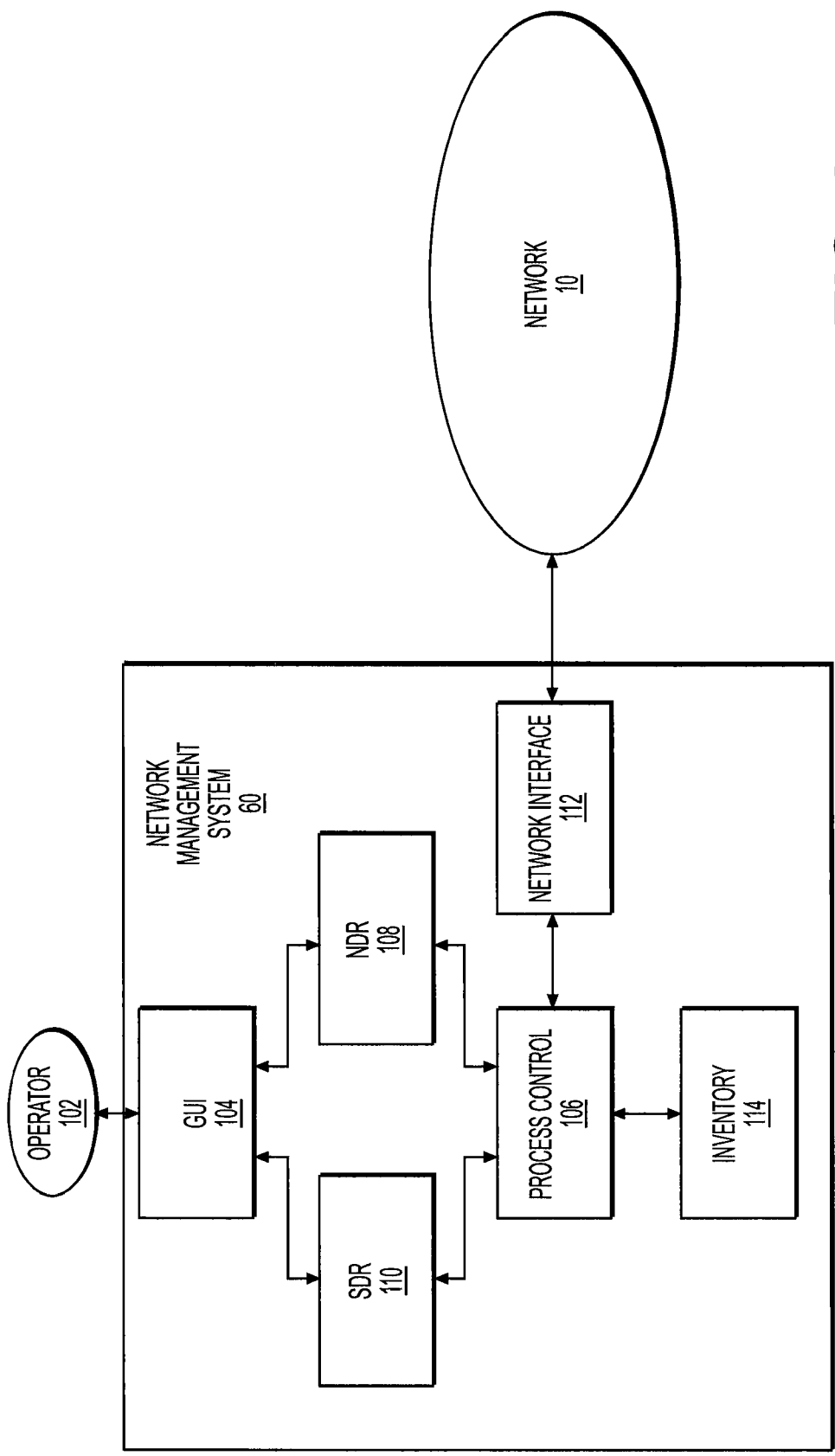

DISCOVERY OF VIRTUAL PRIVATE NETWORKS

BACKGROUND OF THE INVENTION

The invention relates to communication networks and, more particularly, to Virtual Private Networks (VPNs).

A VPN is a private network that is configured within a public network to connect a series of remote users. A public network, in this context, can be any network to which there is access by more than one user, such as the Internet or a core network managed by a Network Service Provider (NSP). A VPN may be used to connect a number of remote or mobile users to a Local Area Network (LAN), or a number of LANs.

From a Network Service Providers (NSPs) perspective, a VPN can be seen as a service for interconnecting a customer's various premises.

An early generation of VPNs was based on point-to-point leased line connections, where there is no router between each item of Customer Premises Equipment (CPE). These are often referred to as "Overlay VPN's" and are still widely used because they offer quality and privacy. However, they are costly for consumers who rarely utilise all the bandwidth they lease.

The new generation of VPNs is based on a Network Service Provider's Internet Protocol (IP) backbone. The main benefit of these is that IP offers instant connectivity between any number of users and/or customer premises, and, as such, optimises the bandwidth usage between all the customers.

Network service providers offering VPN services to their customers face several challenges. One of these challenges is the implementation and maintenance of Operations Support Systems (OSSs) and Business Support Systems (BSSs) in their organisation.

OSSs refer to the systems that help a NSP to perform management, inventory and repair functions on their network. Originally, OSSs were designed to automate manual processes making operation of the network more error-free and efficient. OSSs are now also being used to improve NSPs return on investment through gathering an increased amount of information.

BSSs refer to systems that facilitate the sharing of information between business and customer functions, and network management functions. These systems are generally linked with billing and customer care but these are directly related to OSSs as Quality of Service (QoS) is an important factor in a NSP/customer relation.

To ensure a high level of QoS is delivered to the customer, Network Service Providers must make sure that their OSSs and BSSs can be initialised quickly and with accurate data describing the various networks and services and that they are maintained over time with up to date accurate data.

An important method for ensuring that data is accurate and up to date is through the use of network discovery functions.

An example of a basic network discovery function uses the Internet Control Message Protocol (ICMP) to detect whether a network element at a particular IP address is active. ICMP, uses the basic support of IP as if it were a higher level protocol, however, ICMP is actually an integral part of IP, and must be implemented by every IP module. This network discovery function is more commonly known as a packet "ping", and involves the requesting system sending out a "ping" to a particular IP address and if there is a "ping" returned it is known that that network element is active.

The Simple Network Management Protocol (SNMP) allows more information to be obtained from network elements and is commonly used in network management systems. Once a network element has been confirmed as active by a "ping", neighbouring or other relevant network elements can be identified using SNMP to examine universally available IP routing tables. The newly identified network elements may be "pinged" to ensure they are active and then the IP routing table is consulted again to identify additional currently unknown network elements.

Another method of finding currently unknown network elements is to examine packets of information such as a User Datagram Protocol (UDP) packet. By examining the header information of these packets, IP addresses can be identified by looking at the destination, sender and any pass-through IP addresses. If any IP addresses identified are previously unknown they can then be further examined.

However, discovery of network elements does not complete the information required to run a NSPs network. Additional information is usually required, such as, how the element is connected to other elements and what services the element supports.

VPN services have traditionally been set up manually using a clean data provisioning process. This involves information relevant to VPN functionality being entered by network engineers during the provisioning process. That is, a network engineer sets up a VPN according to details acquired from the customer, such as, security levels and bandwidth required. Normally, this information is then used to populate inventory systems containing relevant network information, including VPN set up for later use by the network. This information can either be automatically populated from a provisioning system or manually entered into the inventory system.

As the inventory systems are effectively manually populated, inevitable flaws in the process create discrepancies in the inventory systems over time.

It is an object of the present invention to overcome this and other drawbacks.

There are several existing methods which try to achieve VPN discovery functions. However, these are either technology or vendor dependant, and apply to IP VPNs only. Existing solutions take advantage of the information held by routing protocols especially Border Gateway Protocol (BGP) or Multi Protocol Label Switching (MPLS) Virtual Routing Forwarding (VRF) tables.

The principal of using configuration rules for discovery is known, including within the frame work of the discovery of network elements pertaining to the functionality required for the VPN services. However, an object of the present invention is to associate network elements with a particular VPN service.

SUMMARY OF THE INVENTION

According to a first aspect of the present invention, there is provided a method of discovering at least one Virtual Private Network (VPN) automatically within a network comprising a plurality of network elements including the steps of:
(i) discovering the network elements which provide functionality for VPNs within the network;
(ii) discovering the role of each network element, as identified in the preceding step, comprising identifying network elements whose role is as customer premise equipment (CPE);
(iii) discovering, for each element identified as customer premise equipment, the VPN the customer premise equipment is associated with.

Preferably, the method of discovering a VPN includes defining configuration rules before the implementation of the first step.

Preferably, the configuration rules use regular expression pattern matching to permit (filter in) or deny (filter out) network element as appropriate.

Preferably, the configuration rules include Network Discovery Rules and Service Discovery Rules.

Preferably, said Network Discovery Rules define ranges of IP addresses to explore for discovery.

Preferably, said Network Discovery Rules define the roles of each piece of equipment discovered, for example, a CPE, a provider edge (PE) or a core router.

Preferably, the Network Element attributes used in said Network Discovery Rules are chassis type and/or interface IP addresses (for example all Cisco routers of type 2500 found in the Network are CPE).

Preferably, said Service Discovery Rules define a range of CPE attribute values which signifies that they belong to a particular VPN.

Preferably, the typical CPE attribute used is the trunk interface IP address.

Preferably, the trunk interface IP address is assigned by a Service Provider for each CPE among a range of registered addresses that are reserved for each VPN.

Preferably, an inventory is stored comprising the network elements and their roles in each VPN.

Preferably, the inventory is updated at appropriate intervals.

Preferably, a Network Management System uses the inventory to manage each VPN.

According to another aspect of the present invention, there is provided an apparatus for discovering a Virtual Private Network including:
  Input means to modify and/or add configuration rules;
  Data storage means for storing the configuration rules and an inventory of each piece of equipment discovered; and
  Network Discovery Means to discover CPE attributes and associate discovered CPE to a particular VPN.

According to another aspect of the present invention, there is provided a Network Management System comprising:
  VPN discovery means further comprising means to discover CPE attributes and means to associate discovered CPE with a particular VPN.

Preferably, the Network Management System further comprises network element controlling means allowing modification of various attributes of a network element.

According to another aspect of the present invention, there is provided a network comprising:
  at least one CPE;
  at least one network management system comprising VPN discovery means further comprising means to discover CPE attributes and means to associate discovered CPE with a particular VPN.

Preferably the network comprises at least one public network.

Preferably the network further comprises at least one private network separated from said at least one public network by CPE.

According to another aspect of the present invention, there is provided a computer program product directly loadable into the internal memory of a digital computer comprising software code portions for performing the steps of the first aspect of the invention when said product is run on a computer.

According to another aspect of the present invention, there is provided a computer system comprising:
  an execution environment for running an application; and
  VPN discovery means further comprising means to discover CPE attributes and means to associate discovered CPE with a particular VPN.

According to another aspect of the present invention, there is provided a computer program product stored on a computer usable medium, comprising:
  computer readable program means for causing a computer to control an execution of an application;
  computer readable program means for VPN discovery further comprising means to discover CPE attributes and means to associate discovered CPE with a particular VPN.

BRIEF DESCRIPTION OF THE DRAWINGS

An embodiment of the present invention will now be described with reference to the following drawings in which:

FIG. 1 shows a schematic view of a Network, including several VPNs;

FIG. 2 shows a schematic view of a Network Management System according to an embodiment of the present invention.

DETAILED DESCRIPTION OF THE PREFERRED EMBODIMENT

With reference to FIG. 1, a public network 10 is shown which could be, for example, the Internet. For a particular Network Service Provider (NSP), several private sites 20, 22 are linked to the public network firstly through a Provider Edge (PE) router 30. The NSP manages equipment, such as PE routers 30, from a management site 24 using standard protocols, such as the Simple Network Management Protocol (SNMP). Any appropriate management protocols may be used for this purpose, other examples include Remote Monitoring (RMON) or Common Object Request Broker Architecture (CORBA). Connected to each PE router 30 is an item of Customer Premise Equipment (CPE) 40, which in this case is a router. Connected to each CPE router 40 are a number of private servers or workstations 50. The private sites 20 can communicate through a VPN 80, denoted by the dashed lines within the network 10, and the private sites 22 can communicate through a VPN 70.

In this case a router has been chosen as the PE equipment and CPE but this could also be any other appropriate device to provide communication between other network elements.

On the management site 24 a network management system 60 controls the operation of all the VPNs 70, 80 for the NSP.

Referring now to FIG. 2, in use, a network operator 102 operates the network management system 60 through a Graphical User Interface (GUI) 104. The operator 102 inputs a series of Network Discovery Rules (NDRs) 108. The NDRs provide the basis by which the network will be explored. The system adheres to the NDRs when exploring the various network elements. The NDRs act as a filter to either accept (filter in) or reject (filter out) network elements based on the information that is returned from them. The NDRs are set to firstly discover any network elements associated with providing functionality for VPNs in the NSP network.

The network management system 60 has a process control 106 which broadcasts a request for information via a network interface 112 to a public network 10 to the IP addresses identified in the NDRs 108.

This information can be requested through use of a standard protocol such as the Simple Network Management Protocol (SNMP).

Only the IP addresses that are active return any information and therefore identify the active network elements.

Once the network elements have been identified as active, they must be classified to determine the role of the element such as PE (FIG. 1, 30), Core routers (not shown) and CPE (FIG. 1, 50).

The network management system 60 uses the NDRs 108 to identify the functionality of the network elements by the attributes that have been returned during the initial request for information. Typical attributes used in these rules are the chassis type, IP address, brand and network interface of the network element.

For example, a NDR uses Regular Expression pattern matching to logically select or deselect subsets of network elements from a defined initial set. The following set of NDRs is defined:

NETWORK 57.23.0.0-57.27.0.0; 57.2.3.0-57.2.4.0
CHASSIS OUT CiscoRouter7200
INTERFACE OUT ATM In this example, "NETWORK" is a command which along with a range of IP addresses defines valid addresses to search for network elements. Further NDRs include commands "CHASSIS" and "INTERFACE" along with "OUT" to indicate that any CiscoRouter7200's and ATM interfaces should not be included in the returned elements. The commands "CHASSIS" and "INTERFACE", in this example, are used to filter out other network elements other than CPE.

The final stage in the full discovery of each VPN in the NSP's network requires the network management system 60 to utilise the SDRs 110 to further classify the services provided by the CPE found in the previous step.

The attributes of each CPE are then filtered with the SDRs 110 and then assigned a VPN based on the outcome.

For example, a SDR uses Regular Expression pattern matching to permit (filter in) CPE equipment to be associated with or deny (filter out) CPE equipment which should not be associated with a particular VPN. The following set of SDRs is defined:

LINK VPN1 57.23.0.0-57.27.0.0; 57.5.7.8
LINK VPN1 CHASSIS CISCO 7505 INTERFACE T3
LINK VPN2 CHASSIS CISCO 7505 INTERFACE ATM

In this case, "VPN1" and "VPN2" are variables representing the particular VPN. "LINK" is a command to associate network elements that are selected from the SDR to the VPN identified. Any element matching the attributes will be associated with the particular VPN in the rule, such as a network element with the IP address 57.5.7.8 in the above example will be associated with "VPN1".

Any attribute that can be identified on the network element may be used in SDRs. These include attributes such as IP address, trunk IP address, Chassis type, Brand and Interfaces Present (Asynchronous Transfer Mode (ATM), Frame Relay, etc.).

The SDRs 110 require operational knowledge of how the NSP provision the VPN services to enable full discovery of all VPNs on the network. The SDRs 110 are not limited by the type of VPN service that the NSP provides, the technology associated with the network or the vendor of any network element.

The role of each network element is stored in an inventory 114 for use in managing each VPN and the network in general. The inventory 114 can be updated at regular intervals by the network management system 60 as defined by the operator 102.

The full automatic discovery of the network elements and the VPN services they are associated with ensures that the inventory 114 does not contain any discrepancies. Once the SDRs 110 have been created and are available to the network management system 60, the inventory 114 is autonomous. Any changes in the SDRs 110 prompt the network management system 60 to re-discover the VPN functionality and alter the inventory 114 accordingly.

If a new network element is added to the network 10 then the role of this network element will be discovered and added to the inventory 114 when the network management system 60 is scheduled for the next update. If these updates are scheduled very close together, for example, every second or even every minute, then the inventory 114 would represent the current status of all of the VPN services for the NSP. The inventory 114 and any history of the inventory 114 that may be stored could be used for other purposes such as identifying problems with VPN functionality.

In a preferred embodiment, the VPN discovery system is based on the OpenView product suite which is the proprietary Operation Support System Platform of Hewlett Packard.

It will be appreciated that modifications may be made to the foregoing without departing from the scope of the invention. Thus, there is provided a system which is configured to automatically discover the identify of every CPE from the VPN to which it belongs, and update and populate an inventory without any human intervention. The above discussion is meant to be illustrative of the principles and various embodiments of the present invention.

Numerous variations and modifications in each of the illustrated examples will become apparent to those skilled in the art once the above disclosure is fully appreciated. It is intended that the following claims be interpreted to embrace all such variations and modifications.

The invention claimed is:

1. A method of automatically discovering, with a network management system (NMS) at least one Virtual Private Network (VPN) within a network comprising a plurality of network elements including the steps of:
   receiving, from a user, at least one network discovery rule (NDR), the at least one NDR configured for providing criteria for searching the network for at least one network element that provides functionality for the at least one VPN;
   discovering, via the at least one NDR, and without reference to the at least one VPN, the at least one network element; and
   discovering a role of the at least one network element, wherein discovering the role of the at least one network element includes:
      the NMS identifying the at least one network element as customer premise equipment; and
      the NMS discovering, for the at least one element identified as customer premise equipment, a particular VPN to which the customer premise equipment is associated.

2. A method as claimed in claim 1, wherein the method includes defining at least one configuration rule prior to discovering the at least one network element.

3. A method as claimed in claim 2, wherein the at least one configuration rule uses regular expression pattern matching to permit or deny a network element as appropriate.

4. A method as claimed in claim 2, wherein said configuration rules include at least one of the following: the at least one Network Discovery Rules and at least one Service Discovery Rule.

5. A method as claimed in claim 4, wherein said the at least one Network Discovery Rule defines ranges of IP addresses to explore for discovery.

6. A method as claimed in claim 4, wherein said at least one Network Discovery Rule uses network element attributes to define the roles of each piece of equipment discovered.

7. A method as claimed in claim 6, wherein the network element attributes used in said at least one Network Discovery Rule includes at least one of the following: chassis type and interface IP addresses.

8. A method as claimed in claim 4, wherein said at least one Service Discovery Rule comprises, for each VPN, a defined range of CPE attribute values which signifies that the at least one Service Discovery Rule belongs to a particular VPN.

9. A method as claimed in claim 8, wherein the CPE attribute used includes a trunk interface IP address.

10. A method as claimed in claim 9, wherein the trunk interface IP address is assigned by a Service Provider for each CPE among a range of registered addresses that are reserved for each VPN.

11. A method as claimed in claim 1, wherein an inventory comprising the VPN network elements and their roles in the VPN functionality is kept in the NMS.

12. A method as claimed in claim 11, wherein the inventory is updated at appropriate intervals.

13. A method as claimed in claim 12, wherein a Network Management System uses the inventory to manage each VPN.

14. An network management system (NMS), coupled to a network via an edge router, for discovering a Virtual Private Network (VPN) comprising:
  receive means configured to receive, from a user, at least one network discovery rule (NDR), the at least one NDR configured for providing criteria for searching the network for at least one VPN;
  input means configured to modify at least one NDR, the input means further configured to add at least one configuration rule;
  data storage means for storing the at least one configuration rule; and
  network discovery means to discover, based on the at least one configuration rule, a CPE coupled to the network via a different edge router and associate, based on attributes of the discovered CPE, the discovered CPE to a particular VPN.

15. A network management system coupled to a network via an edge router comprising:
  virtual private network (VPN) discovery means configured to:
    receive, from a user, at least one network discovery rule (NDR), the at least one NDR configured for providing criteria for searching the at least one VPN;
    discover, based on the NDR, a CPE coupled to the network via a different edge router; and
    associate, based on attributes of the discovered CPE, the discovered CPE with a particular VPN.

16. A network management system as claimed in claim 15, wherein the network comprises at least one public network.

17. A network management system as claimed in claim 16, wherein the network further comprises at least one private network separated from said at least one public network by CPE.

18. A non-transitory computer-readable medium that includes a computer program product for a network management system (NMS) directly loadable into an internal memory of a digital computer, the computer program product configured, such that when executed by a computer, performs the steps of:
  receiving, from a user, at least one network discovery rule (NDR), the at least one NDR configured for providing criteria for searching the at least one VPN;
  discovering, via the at least one NDR, and without reference to the at least one VPN, at least one network element that provides functionality for the at least one VPN; and
  discovering a role of the at least one network element, wherein discovering the role of the at least one network element includes:
    the NMS identifying the at least one network element as customer premise equipment, and
    the NMS discovering, for the at least one element identified as customer premise equipment, a VPN to which the customer premise equipment is associated.

19. A computer system coupled to a network via an edge router comprising:
  an execution environment for running an application;
  receive means to receive, from a user, at least one network discovery rule (NDR), the at least one NDR configured for providing criteria for searching the at least one VPN;
  VPN discovery means further comprising means to discover a CPE coupled to the network via a different edge router; and
  associate means to associate, based on attributes of the discovered CPE, the discovered CPE with a particular VPN.

20. A computer program product stored on a non-transitory computer usable medium, comprising:
  computer readable program means for causing a computer, coupled to a network via an edge router, to control an execution of an application;
  computer readable program means for receiving, from a user, at least one network discovery rule (NDR), the at least one NDR configured for providing criteria for searching the at least one VPN;
  computer readable program means for VPN discovery further comprising means to discover a CPE coupled to the network via a different edge router; and
  means to associate, based on attributes of the discovered CPE, the discovered CPE with a particular VPN.

21. A method of automatically discovering, with a network management system (NMS), at least one Virtual Private Network (VPN) within a network, comprising:
  receiving at the NMS, from a user, at least one network discovery rule (NDR), the at least one NDR configured for providing criteria for searching the network for network elements;
  discovering with the NMS, via the at least one NDR, the network elements and attributes of each network element;
  classifying with the NMS each network element, based on its attributes, to determine a role of the network element in the network, including classifying at least one of the network elements as a customer premise equipment (CPE);
  processing with the NMS the attributes of each CPE to determine a particular VPN with which the CPE is associated.

22. The method of claim 21, wherein the attributes of each CPE are processed according to at least one service discovery rule (SDR) to determine the particular VPN, the at least one SDR defined prior to the discovering.

23. The method of claim 22, further comprising:
  storing the role of each network element in an inventory; and repeating the receiving, discovering, classifying, and processing in response to a change in the at least one SDR.

24. The method of claim 21, further comprising:
storing the role of each network element in an inventory;
repeating the receiving, discovering, classifying, and processing, and updating a history of the inventory;

detecting a problem with the operation of the particular VPN; and
analyzing the history to identify the problem.

\* \* \* \* \*

UNITED STATES PATENT AND TRADEMARK OFFICE
CERTIFICATE OF CORRECTION

PATENT NO. : 8,134,923 B2
APPLICATION NO. : 10/941536
DATED : March 13, 2012
INVENTOR(S) : Olivier Daures It is certified that error appears in the above-identified patent and that said Letters Patent is hereby corrected as shown below:

In column 6, line 63, in Claim 4, delete "Rules" and insert -- Rule --, therefor.

In column 7, line 13, in Claim 9, after "attribute" delete "used".

In column 7, line 27, in Claim 14, delete "An" and insert -- A --, therefor.

Signed and Sealed this
Sixth Day of November, 2012

David J. Kappos
*Director of the United States Patent and Trademark Office*